United States Patent
Kathirasan et al.

(10) Patent No.: US 12,160,655 B2
(45) Date of Patent: Dec. 3, 2024

(54) CAMERA PROFILES BASED ON PHYSICAL ACCESS ACTIONS

(71) Applicant: MOTOROLA SOLUTIONS, INC., Chicago, IL (US)

(72) Inventors: Yuktesvaranath Kathirasan, Sungai Petani (MY); Chun Meng Tan, Bayan Lepas (MY); Boon Teong Ooi, Bayan Lepas (MY); David Wei Ren Low, Bayan Lepas (MY); Zhe Qian Goh, Simpang Ampat (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 209 days.

(21) Appl. No.: 18/091,083

(22) Filed: Dec. 29, 2022

(65) Prior Publication Data
US 2024/0223886 A1    Jul. 4, 2024

(51) Int. Cl.
*H04N 23/62*    (2023.01)
*H04N 23/69*    (2023.01)
*H04N 23/695*    (2023.01)
*H04W 4/021*    (2018.01)

(52) U.S. Cl.
CPC ............. *H04N 23/62* (2023.01); *H04N 23/69* (2023.01); *H04N 23/695* (2023.01); *H04W 4/021* (2013.01)

(58) Field of Classification Search
CPC ..... H04W 4/021; H04N 23/661; H04N 23/69; H04N 23/60; H04N 23/62; H04N 7/186; G08B 13/19695; G08B 13/19669; G08B 13/19667
USPC .................................................... 348/333.01
See application file for complete search history.

(56) References Cited

U.S. PATENT DOCUMENTS

| | | | |
|---|---|---|---|
| 9,538,062 B2 | 1/2017 | Cronin | |
| 10,827,336 B2 | 11/2020 | Lingala et al. | |
| 11,018,939 B1 * | 5/2021 | Harris | G06K 7/1413 |
| 11,580,833 B2 * | 2/2023 | Ramanathan | H04N 7/181 |
| 11,748,991 B1 * | 9/2023 | Day | B60Q 3/74 |
| | | | 348/143 |
| 11,798,340 B1 * | 10/2023 | Xu | G07C 9/30 |
| 11,899,467 B2 * | 2/2024 | Kim | G05D 1/246 |
| 2002/0067259 A1 * | 6/2002 | Fufidio | G07C 9/28 |
| | | | 340/541 |
| 2017/0162598 A1 * | 6/2017 | Zhang | G02F 1/134309 |
| 2018/0012460 A1 * | 1/2018 | Heitz, III | G08B 13/19682 |

(Continued)

FOREIGN PATENT DOCUMENTS

| | | |
|---|---|---|
| CN | 107734249 A | 2/2018 |
| JP | 2012084026 A | 4/2012 |
| WO | WO-2020092460 A1 | 5/2020 |

OTHER PUBLICATIONS

PCT/US2023/031846, Camera Profiles Based on Physical Access Actions, filed on Sep. 1, 2023.

*Primary Examiner* — Pritham D Prabhakher
(74) *Attorney, Agent, or Firm* — PERRY + CURRIER, INC.

(57) ABSTRACT

An indication of a physical access action performed by a person in proximity of a camera determines a manner in which the physical access action is performed. An operational profile of the camera is set to control capture at the proximity of the camera based on the manner in which the physical access action is performed. This includes selecting the operational profile from a first operational profile and a second operational profile that is different from the first operational profile.

20 Claims, 8 Drawing Sheets

(56) References Cited

U.S. PATENT DOCUMENTS

| | | | |
|---|---|---|---|
| 2019/0012891 A1* | 1/2019 | Zhu | G08B 13/19684 |
| 2020/0285248 A1* | 9/2020 | Kim | G05D 1/249 |
| 2021/0304574 A1* | 9/2021 | Ramanathan | H04N 7/181 |
| 2022/0295008 A1* | 9/2022 | Nold | G11B 27/031 |
| 2022/0319261 A1* | 10/2022 | Dabel | E05F 15/76 |
| 2023/0064892 A1* | 3/2023 | Carter | G08B 13/19608 |
| 2024/0027982 A1* | 1/2024 | Hu | G06V 10/82 |
| 2024/0183142 A1* | 6/2024 | Clark | G06Q 10/20 |

* cited by examiner

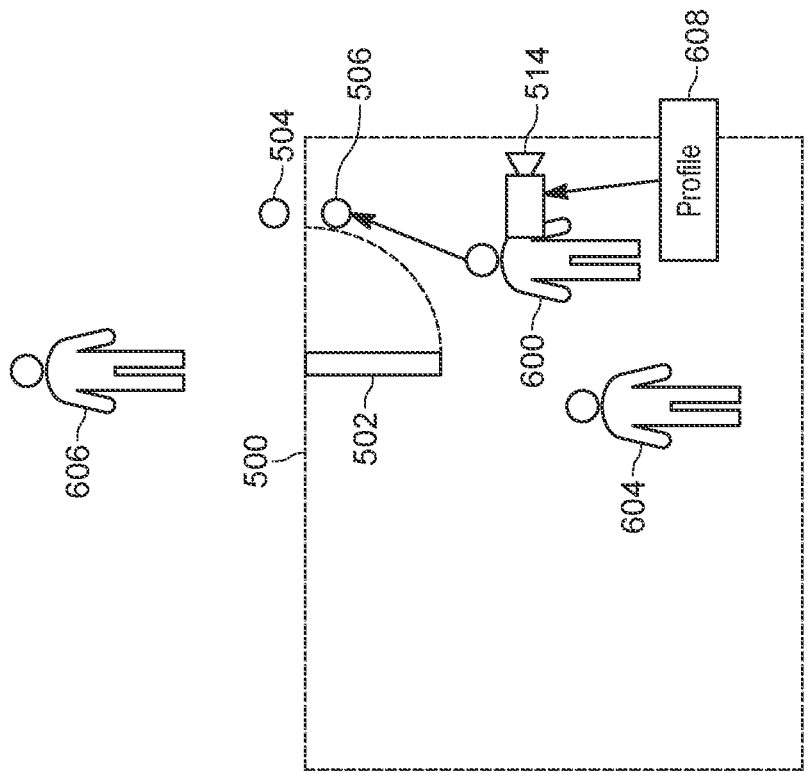
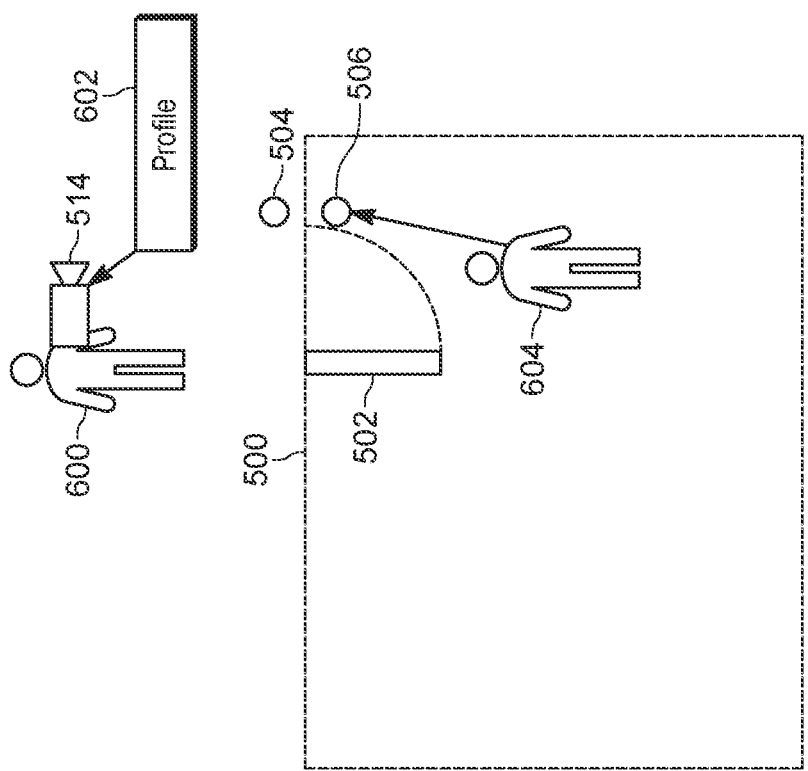

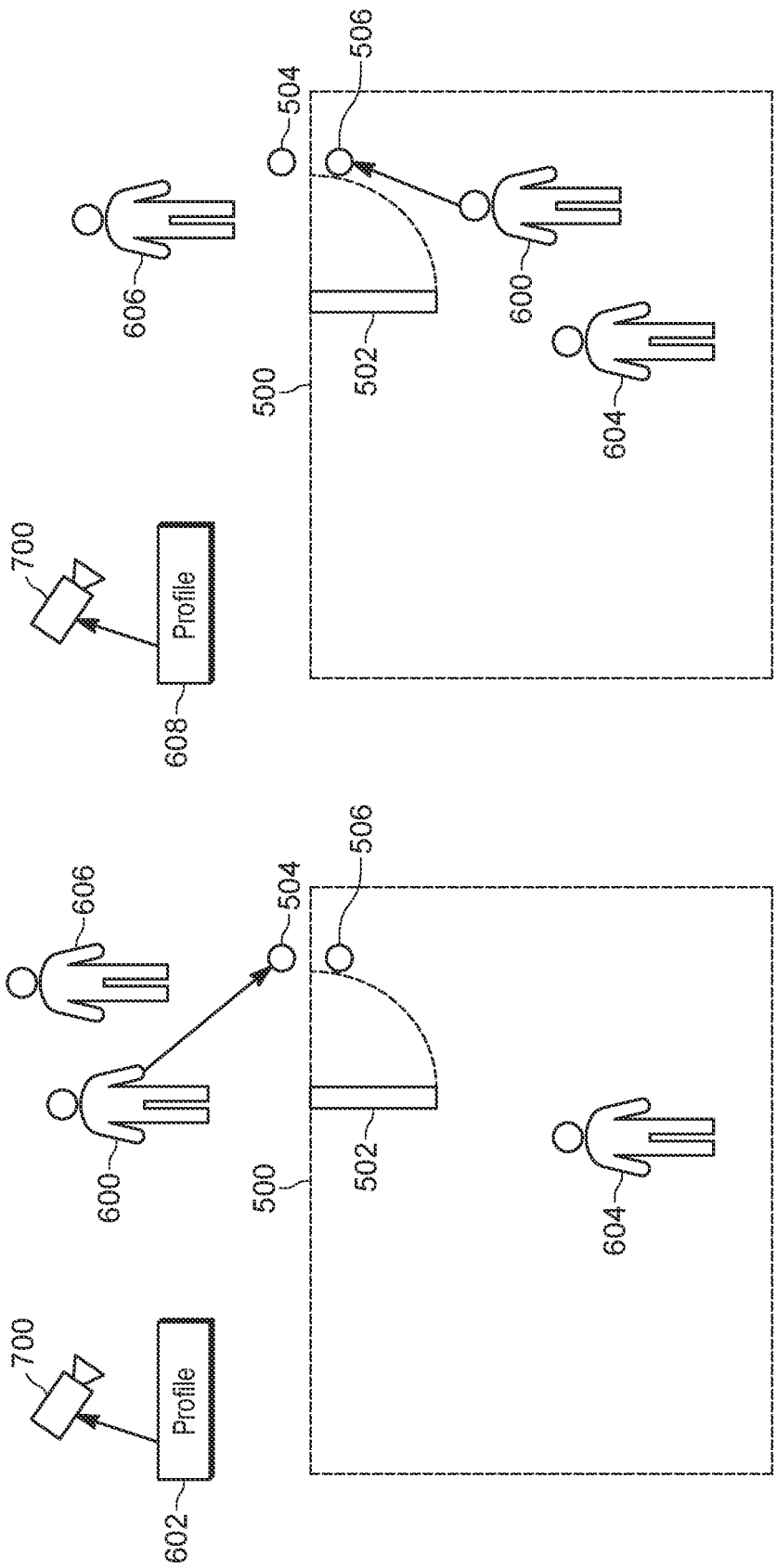

CAMERA PROFILES BASED ON PHYSICAL ACCESS ACTIONS

BACKGROUND

Cameras are often used to capture or record video and audio information. Wearable or mobile cameras may be useful for people at the workplace for security, liability, and other purposes. Fixed cameras may be installed at workplaces for the same reasons. Modern cameras often have a large amount of functionality.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

FIG. 6A is a schematic diagram of another example of setting a mobile camera profile based on opening a door from the outside.

FIG. 6B is a schematic diagram of another example of setting a mobile camera profile based on opening the door of FIG. 6A from the inside.

FIG. 7A is a schematic diagram of an example of setting a fixed-position camera profile based on opening a door from the outside.

FIG. 7B is a schematic diagram of an example of setting a fixed-position camera profile based on opening the door of FIG. 7A from the inside.

Figure 1:
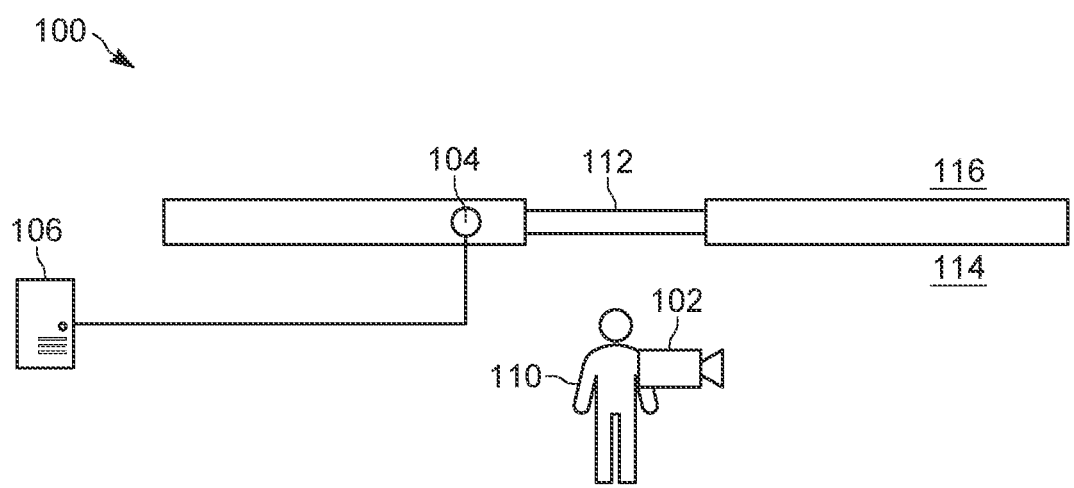
FIG. 1 is a block diagram of an example system to set a camera profile based on a manner in which a physical access action is performed.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The system, apparatus, and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

Cameras, while useful in the workplace and other locations, often have functionality that may or may not be desired in various situations. For example, a camera may be deployed for security purposes, but the same camera may raise privacy concerns. The desired functionality of a camera may be dependent on a given situation.

While a human user may manually configure the camera functionality to suit the situational needs, not every time the human user would be able to know the situation prior to the incident and pre-configure the camera functionality to perform at the right desired limit. For example, a hotel worker who wears a camera for security purposes may not turn off the camera prior to visiting the room unexpectedly with a guest still inside the room. Similar situations arise with cameras deployed to medical facilities, government offices, homes, business, traffic control and so on.

The techniques disclosed herein allow for the usefulness of cameras to be maintained, in terms of security, safety, liability, etc., while respecting other needs, such as privacy. As will be discussed in detail, a camera's operating profile, which governs the set of information collected (e.g., video, audio, etc.) at a given time, may be automatically selected based on the manner in which a physical access action is performed by a person associated with the camera, such as the way in which a door is opened by the person wearing a body-worn camera or in the scene of a fixed-position camera. Determining the manner of such actions provides situational context for deciding what kind of information should be captured or recorded by the camera.

In accordance with an example embodiment, a non-transitory machine-readable medium includes instructions that, when executed by a processor, cause the processor to receive an indication of a physical access action performed by a person in proximity of a camera, determine a manner in which the physical access action is performed, and select an operational profile of the camera to control capture at the proximity of the camera based on the manner in which the physical access action is performed, including switching from a first operational profile to a second operational profile that is different from the first operational profile.

In accordance with another example embodiment, a system includes a sensor configured to capture sensor data that describes a physical access action, a camera operable according to an operational profile to capture a scene that includes a physical access location subject to the physical access action, and a processor connected to the sensor and the camera. The processor is configured to determine a manner in which the physical access action is performed based on the sensor data captured by the sensor, and set the operational profile of the camera based on the manner in which the physical access action is performed by selecting the operational profile from a first operational profile and a second operational profile that is different from the first operational profile.

In accordance with another example embodiment, method includes receiving an indication of a physical access action performed by a person in proximity of a camera, determining a manner in which the physical access action is performed, and setting an operational profile of the camera to control capture at the proximity of the camera based on the manner in which the physical access action is performed by selecting the operational profile from a first operational profile and a second operational profile that is different from the first operational profile.

The above-mentioned embodiments will be discussed in more detail below, starting with example system and device architectures of the system in which the embodiments may be practiced, followed by an illustration of processing blocks for achieving an improved technical method, device, and system for generation of follow-up action based on information security risks.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the figures.

FIG. 1 shows an example system 100. The system 100 includes a camera 102, a sensor 104, and a computing system 106. The system 100 uses the sensor 104 to determine a manner in which a physical access action is performed and controls the nature of information capture by the camera 102 accordingly. In various examples, the physical access action is performed by a person 110, such as the person 110 operating a door 112.

The camera 102 is a digital camera capable of capturing digital video. The camera 102 may also be capable of capturing audio. The camera 102 may additionally record (store) captured video and/or audio. Additionally or alternatively, the camera 102 may transmit captured data to a computing device for recording at non-volatile storage.

The camera 102 operates according to an operational profile that determines the set of information captured. Different sets of information may be obtained from different types of capture (e.g., video or audio) or different content captured, such as aiming or zooming the camera at different scenes. The camera 102 has at least two operational profiles that capture different sets of information, such as video and audio, video only, audio only, or no video and no audio. Functions of the camera 102 that may be turned on/off or configured differently in the different profiles include video capture, audio capture, pan, zoom, tilt, filter, light capture spectrum (e.g., visible light, infrared light, etc.), video compression, video storage, audio compression, audio storage, and video analytics (e.g., face detection or recognition). For example, a first operational profile may turn on video capture and turn on audio capture, while a second operational profile may turn on video capture, turn off audio capture, and pan the camera to a different scene.

The camera 102 may be a mobile camera, such as a body-worn camera (bodycam) or vehicle-mounted camera. The camera 102 may be wearable by a person 110 expected to perform the physical access action or mounted to a vehicle expected to be near the physical access action. As such, a body-worn or vehicle-mounted camera is inherently capable of capturing the scene around where a physical access action is performed. Alternatively, the camera 102 may be fixed-position camera, such as a camera attached to a wall or ceiling and aimed at a location where the physical access action is performed. A fixed-position camera may be aimed statically or dynamically to capture the scene at such location. Static aiming may use a mechanical pivot to manually set pan, tilt, or both. Dynamic aiming may use an actuator to control pan, tilt, or both.

The sensor 104 may include any suitable type of sensor able to describe the particular physical access action expected. Examples sensors include a switch, a button, a touch sensor, a touchscreen, a keypad, a potentiometer, an accelerometer, a photosensor, an ultrasonic sensor, a motion sensor, a thermal sensor, a card reader, a near-field antenna, a short-range wireless antenna, camera vision and similar.

In various examples, a sensor 104 is separate from the camera 102. In other examples, a sensor 104 may be part of the camera 102 or a function of the camera (e.g., an image recognition function). For example, an ultrasonic sensor may be mounted to a bodycam and may be capable of detecting the opening of a door.

The sensor 104 is selected and positioned to be responsive to the manner in which the physical access action is performed. Sensor data obtained from the sensor 104 may directly indicate the manner in which the physical access is performed. For example, an outside door handle may be provided with a contact switch that detects actuation of the handle by a human hand. The sensed manner of physical access action may thus be manual opening of the door from the outside. Alternatively, sensor data obtained from the sensor may undergo an analysis, which may also consider data from another source. For example, a motion sensor data and schedule data from the work schedules of people who work around a door may be analyzed to infer that the door is opened from the outside.

The sensing of the manner in which the physical access action is performed is more than merely detecting that a door has been opened or closed. The way in which the physical access action is performed is determined. In other words, sensor data (and other data, if used) provides context about the physical access action. For some types of physical access, such as a door, sensing the manner of action may inform the role of the person operating the door, the role of the person normally expected to be on the other side of the door, a security level expected for the space on the other side of the door, a privacy level expected for the space on the other side of the door, and so on. Many of these situations may require a change in operation of a camera. Detecting opening or closing of the door may be insufficient to determine the context of the situation. For example, a door opened from the outside may expose a sensitive scene to the camera, while the same door opened from the inside may not. The same door may be opened in different ways that provide different expectations. As such, the term "manner" used herein is consistent with a way, mode, direction, or modality that provides additional contextual information about a simple physical access action.

Other examples of physical access action include walking down a hallway, entering/leaving a room or area without a door, driving down a narrow street or ally, and similar.

In examples that implement mobile cameras, the sensor 104 or another sensor connected to the computing system 106 may be used to establish that a particular camera 102 is proximate to the location at which the physical access action will occur. That is, the proximity of the camera 102 to the door 112 (or other type of physical access) may be sensed to determine whether or not the camera 102 should have its operational profile switched when the door 112 is operated (or the other physical access action is performed).

The computing system 106 may include a server or similar computing device that includes a processor, volatile memory (e.g., random-access memory or RAM), and non-transitory machine-readable medium (i.e., non-volatile storage) for storing instructions that may be executed by the processor cooperating with the volatile memory.

The computing system 106 may be connected to the sensor 104 to collect sensor data. The computing system 106 may process or analyze the sensor data and may determine the manner in which the physical access action is performed. The connection of the sensor 104 to the computing system 106 may be wired or wireless.

The computing system 106 may be connected to the camera 102 to control the operational mode of the camera 102. The computing system 106 may also receive captured information from the camera 102 and record such information in for review, archiving, or auditing purposes. The connection of the camera 102 to the computing system 106 may be wired or wireless. For example, a body-worn camera would normally use a wireless connection, while a fixed-position camera may use a wired or wireless connection.

The computing system 106 may include any suitable number and configuration of computing devices. For example, separate computing devices may be connected to the camera 102 and the sensor 104 and such separate computing devices may be in mutual communication to share information. Either or both computing devices may perform an analysis to determine the manner of physical access. In another example, the system 106 includes a processor of the camera 102 and a separate computing device to capture data from the sensor 104. That is, the onboard processing functionality of the camera 102 may form part of the computing system 106. In still another example, computing system 106 is a cloud computing environment. In still another example, a processor at the sensor 104 or at the camera 102 is the computing system 106. Numerous other examples are contemplated and the specific features of the computing system 106 are expected to vary based on implementation requirements.

In an example of operation of the system 100, the person 110 approaches a physical access location. For example, the person approaches a door 112 from outside 114 a room. At this time, the camera 102 is operating according to a first operational profile. The first operational profile may have the camera 102 recording video and audio because outside 114 of the room is a non-secure or non-private environment. Then, the person 110 performs the physical access action, for example, by using the door handle to open the door 112. The sensor 104 senses the action and provides corresponding sensor data to the computing system 106. The computing system 106 determines that the manner in which the physical access action is performed is the door 112 being opened from the outside 114. This manner of action is predetermined to present a situation that requires the camera to stop recording video. For example, inside the room 116 may be a secure or private environment. Accordingly, the computing system 106 commands the camera 102 to switch to a second operational profile that does not record video. If the person 110 leaves the room, a similar process may be performed to return the camera to the first operational profile.

Figure 2:
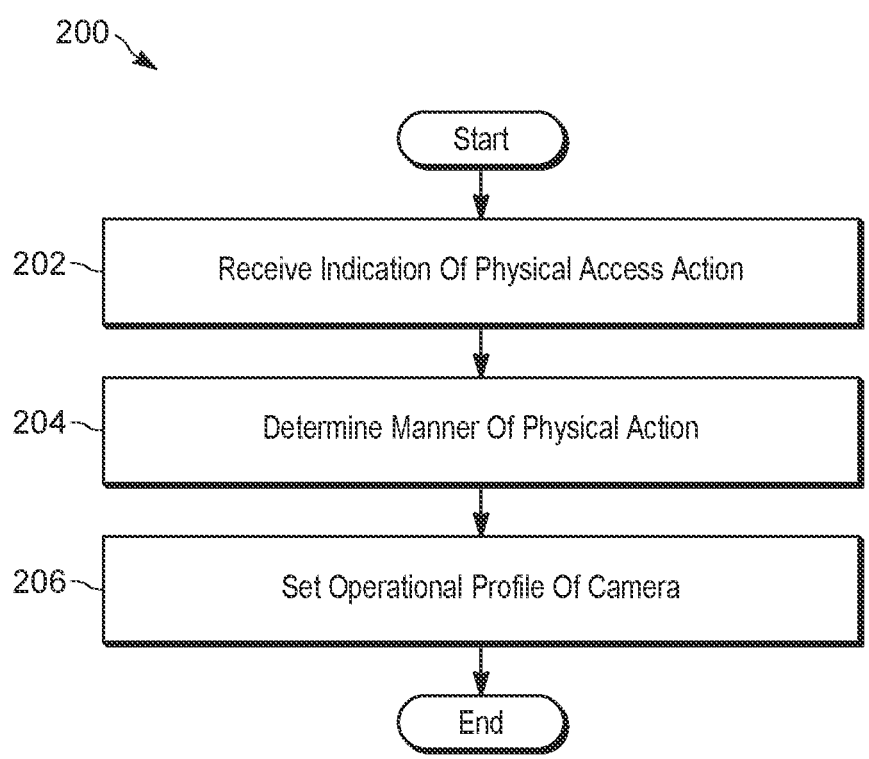
FIG. 2 is a flowchart of an example method for setting a camera profile based on a manner in which a physical access action is performed.

FIG. 2 shows an example method 200 of controlling a camera's operational profile based on a manner in which physical access action is performed. The system 100 or any of the other systems discussed herein may be used to carry out the method 200. The method 200 may be embodied by instructions that are executed by a processor.

At block 202, an indication of a physical access action performed by a person in proximity of a camera is received. The indication of the physical access action may include sensor data captured by a sensor responsive to the physical access action. Such a sensor may be proximate to the camera in what may be termed a physical access location. For example, a sensor may monitor the operation of a door and the camera may capture a scene at the door. As mentioned elsewhere herein, the camera may be a body-worn camera or a fixed-position camera. In the example of a body-worn camera, the sensor responsive to the physical access action or another sensor may be used to detect that the camera is at the physical access location and relevant to the physical access action.

At block 204, the manner in which the physical access action is performed is determined using information captured by the sensor at block 202. This may include directly making a decision based on the sensor data, such as comparing a sensor signal to a threshold and determining whether the signal passes the threshold. In other examples, sensor data may be analyzed. Example analyses include a logical conditions or cases (e.g., if "signal A"=1 AND "signal B"=0 then switch to "profile X"), a decision tree, heuristics, machine learning, and similar. An analysis may be considered a set of rules that replace human subjectivity. The analysis of the sensor data may be done in conjunction with other data related to the physical access action. For example, scheduling data related to the physical access location may be referenced to provide context for how the sensor data should be interpreted.

At block 206, the operational profile of the camera is set based on the determined the manner in which the physical access action is performed obtained from block 204. The operational profile of the camera controls the set of information collected by the camera (e.g., video, audio, both, or none), as discussed elsewhere herein. The operational profile may be selected from any number of suitable preconfigured operational profiles.

Figure 3:
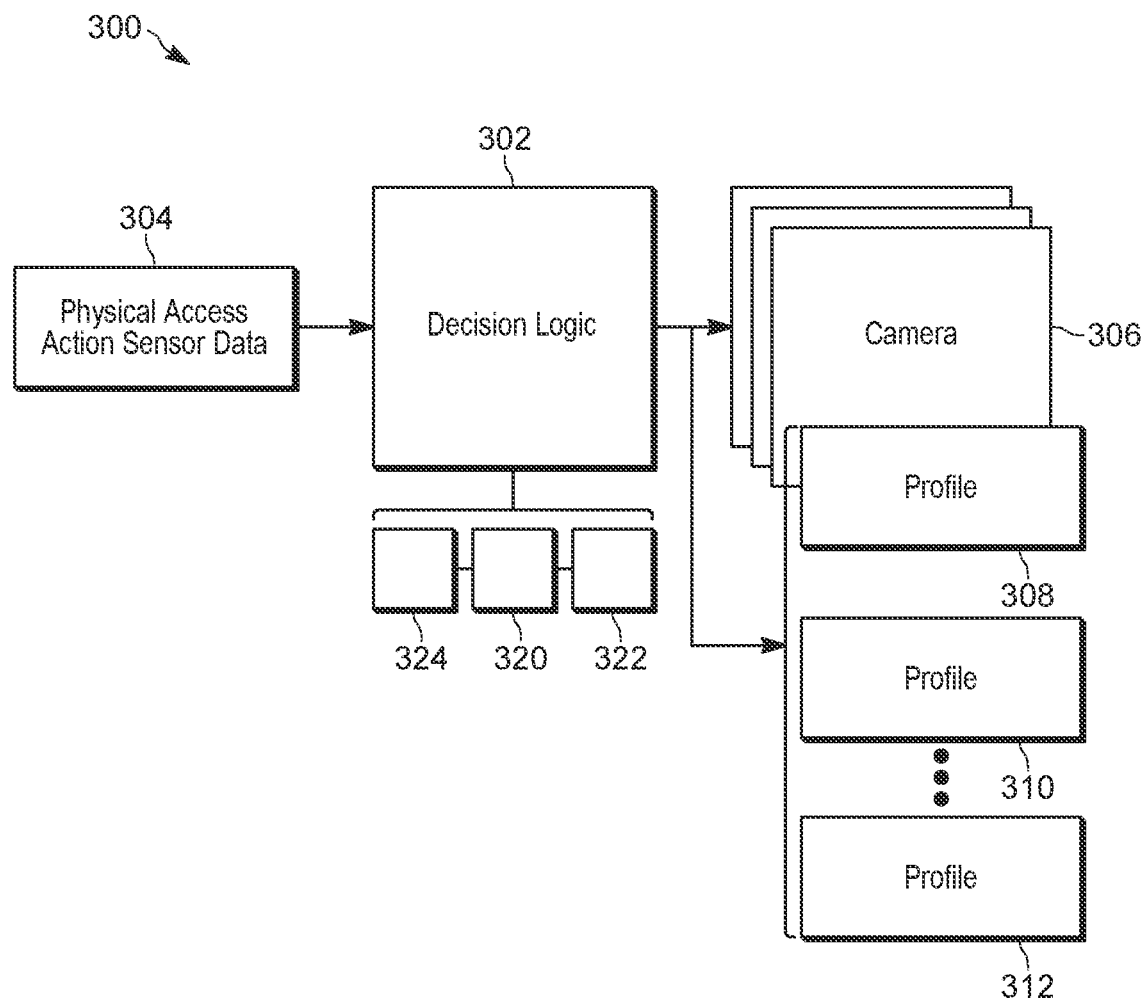
FIG. 3 is a schematic diagram of an example data processing system to set a camera profile based on physical access sensor data.

FIG. 3 shows an example data processing system 300 to set a camera profile based on physical access sensor data. The data processing system 300 may be used with the system 100 of FIG. 1, the method 200 of FIG. 2, or any of the other systems and methods discussed herein. The data processing system 300 may be embodied by instructions that are executed by a processor.

The data processing system 300 includes decision logic 302 that takes as input sensor data 304 captured from a sensor that is responsive to a physical access action, such as the operating of a door. The sensor data 304 describes the manner in which the physical access action is performed. For example, the sensor data 304 may indicate that the door was opened from the inside or the outside of a room. In another example, the sensor data 304 may indicate that the door was opened manually or automatically by an electromechanical actuator.

The decision logic 302 selects an operational profile 308, 310, 312 for a camera 306 that captures the scene around the physical access action. The sensor data 304 as processed by the decision logic 302 is sufficient to select a suitable operational profile 308, 310, 312 for the determined manner of the physical access action. For example, if the sensor data 304 is captured by touch sensors on inside and outside door handles, the decision logic 302 may be configured to determine which door handle is touched. This may be implemented as a threshold level for each touch sensor signal, and the decision logic 302 may be configured to associate a touch signal that passes its respective threshold with an operational profile 308, 310, 312. As such, the decision logic 302 may be configured to extract sufficient context about the physical access action from the sensor data 304 to select a suitable operational profile 308, 310, 312 for the camera 306.

The decision logic 302 may also select the particular camera or cameras 306 to set the determined operational profile 308, 310, 312. In various examples, multiple cameras 306 may have profiles controlled by the decision logic 302. For example, the decision logic 302 may set profiles for several cameras 306 situated at a physical access location described by the same senor data 304. In another example, the decision logic 302 may set profiles for many cameras 306 distributed among a wide range of physical access locations described by sensor data 304 from many sensors distributed among the physical access locations. Accordingly, the decision logic 302 may be configured to link each camera 306 to relevant sensor data 304.

A camera 306 may be linked to sensor data 304 statically or dynamically. A static link may be useful for a fixed-position camera 306, in that the relevant sensor data 304 originates from a static set of sensors at the same location. A dynamic link may be useful for mobile cameras 306, such as body-worn cameras, in that the relevant sensor data 304 is expected to depend on the location of the camera 306. In such examples, the sensor data 304 also identifies the relevant camera or cameras 306. This may be done with a sensor that is capable of detecting a camera 306, such as a near-field sensor that detects a wireless signal emitted by the camera 306 as well as a scan of an access card carried by the wearer of the camera. In another example, access codes may be associated with people who are associated with body-worn cameras. When a particular access code is typed into a keypad (i.e., the sensor) to perform a physical access action (e.g., open a door), the access code may be used to determine the manner of access (e.g., the side of the door the keypad is on) as well as identify the relevant camera 306 to take the determined operational profile (e.g., by way of the association of camera, person, and access code).

The data processing system 300 may include a processor 320 and connected non-transitory machine-readable medium 322 (e.g., volatile and/or non-volatile memory) that cooperate to execute the decision logic 302. The data processing system 300 may further include an interface 324, such as a wired or wireless communications interface, connected to the processor 320 to receive the sensor data 304 and output a resulting select signal to the cameras 306. The data processing system 300 may be implemented with the computing system 106 of FIG. 1.

Figure 4:
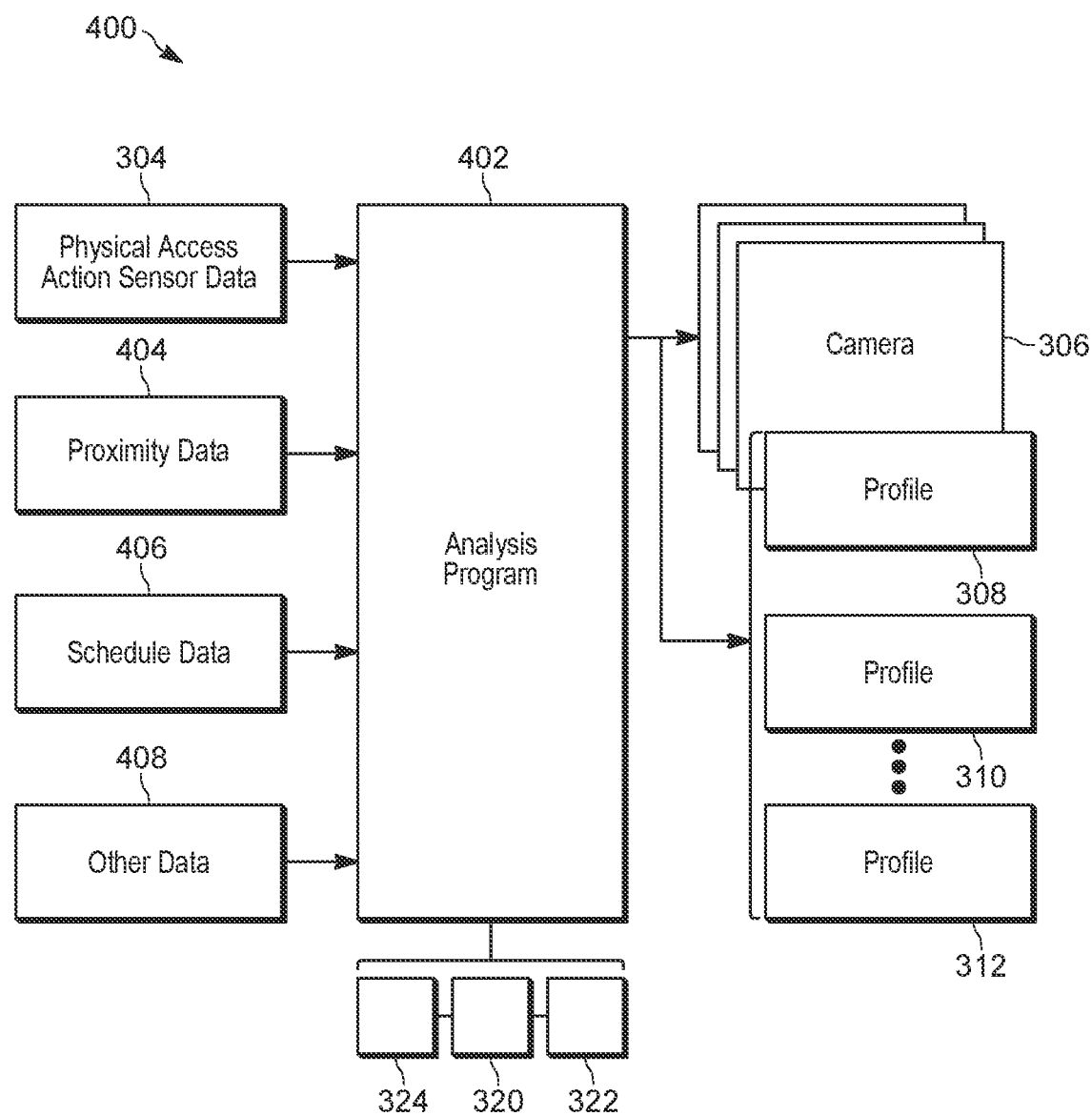
FIG. 4 is a schematic diagram of an example data processing system to set a camera profile based on physical access sensor data and other data.

FIG. 4 shows an example data processing system 400 to set a camera profile based on physical access sensor data and other data. The data processing system 400 may be used with the system 100 of FIG. 1, the method 200 of FIG. 2, or any of the other systems and methods discussed herein. The data processing system 400 may be embodied by instructions that are executed by a processor.

The data processing system 400 includes an analysis program 402 that takes as input sensor data 304 captured from a sensor that is responsive to a physical access action, such as the operating of a door. As discussed above with respect to FIG. 3, the sensor data 304 describes the manner in which the physical access action is performed. Other features and aspects of the system 300 of FIG. 3 may be applied to the system 400 of FIG. 4, and only differences will be described in detail.

The analysis program 402 may also take other data as input, such as proximity data 404, schedule data 406, and data 408 from other sources or sensors.

Proximity data 404 may be used to link cameras 306 and sensor data 304 indicative of physical access actions to physical access locations. This may be particularly useful in the case of mobile cameras, such as body-worn cameras. Proximity data 404 may be captured by sensors configured to detect the presence or location of a camera 306. For example, a near-field sensor may detect a wireless signal emitted by a camera 306. The known location of the near-field sensor may be correlated to the known locations of sensors that capture the sensor data 304, so that the relevant mobile cameras 306 may be determined. In another example, a mobile camera 306 may have a global-positioning subsystem that may be used to determine the location of the camera 306. Indoor wireless locating techniques may also be used if a mobile camera 306 includes a wireless (e.g., Wi-Fi™ or Bluetooth™) subsystem. Proximity data 404 may thus establish a set of sensor data 304 and a set of cameras 306 that are relevant to the same physical access location.

Schedule data 406 may inform which operational profile 308, 310, 312 to select as the security or privacy of certain locations may be time dependent. For example, a meeting in a particular room may concern sensitive information. Accordingly, schedule data 406 may be referenced to determine whether that meeting is occurring when a physical access action takes place at or near the location of the meeting. In another example, privacy at a certain location, such as a hotel room, may be of greater concern during certain hours of the day.

Schedule data 406 may also help disambiguate the linking of mobile cameras 306 to physical access locations. For example, if several cameras 306 are determined by sensors to likely to be present at a physical access location, schedule data 406 that places a given camera 306 at the physical access location may give an increased likelihood to that camera 306.

Other data 408 from other data sources or sensors may also be provided as input to the analysis program 402. Examples of other data include weather, news, alarms, and alerts.

The analysis program 402 may include a set of logical conditions or cases, a decision tree, heuristic system, a machine-learning system, or similar. The analysis program 402 may compute an inference of an operational profile for the affected cameras 306 from the data 304, 404, 406, 408 provided.

The data processing system 400 may include a processor 320 and connected non-transitory machine-readable medium 322 (e.g., volatile and/or non-volatile memory) that cooperate to execute the analysis program 402. The data processing system 400 may further include an interface 324, such as a wired or wireless communications interface, connected to the processor 320 to receive the sensor data 304, proximity data 404, schedule data 406, or other data 408 and output a resulting select signal to the cameras 306. The data processing system 400 may be implemented with the computing system 106 of FIG. 1.

Figure 5B:
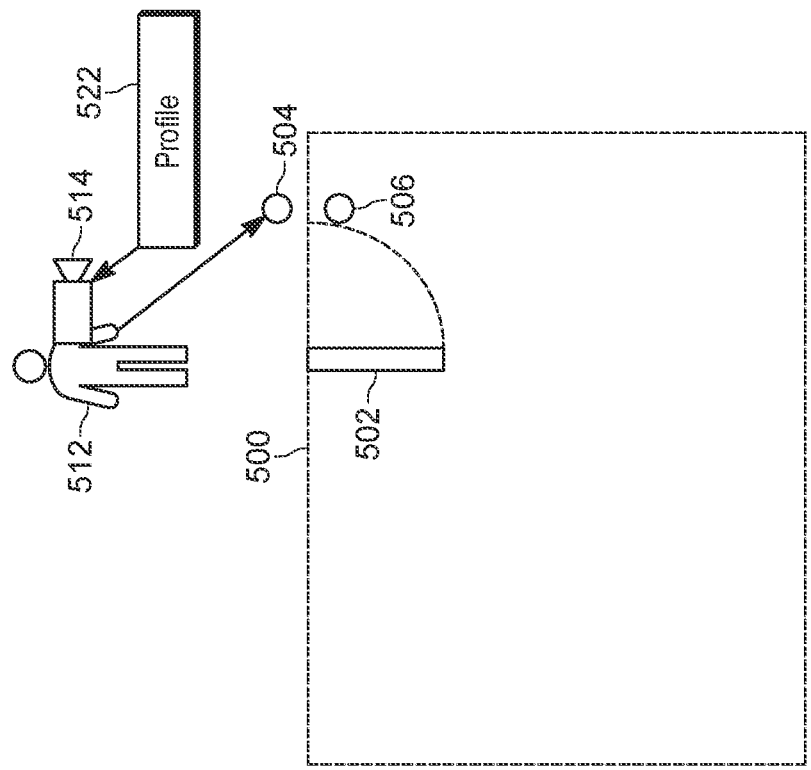
FIG. 5B is a schematic diagram of an example of setting a mobile camera profile based on opening the door of FIG. 5A from the inside.
Figure 5A:
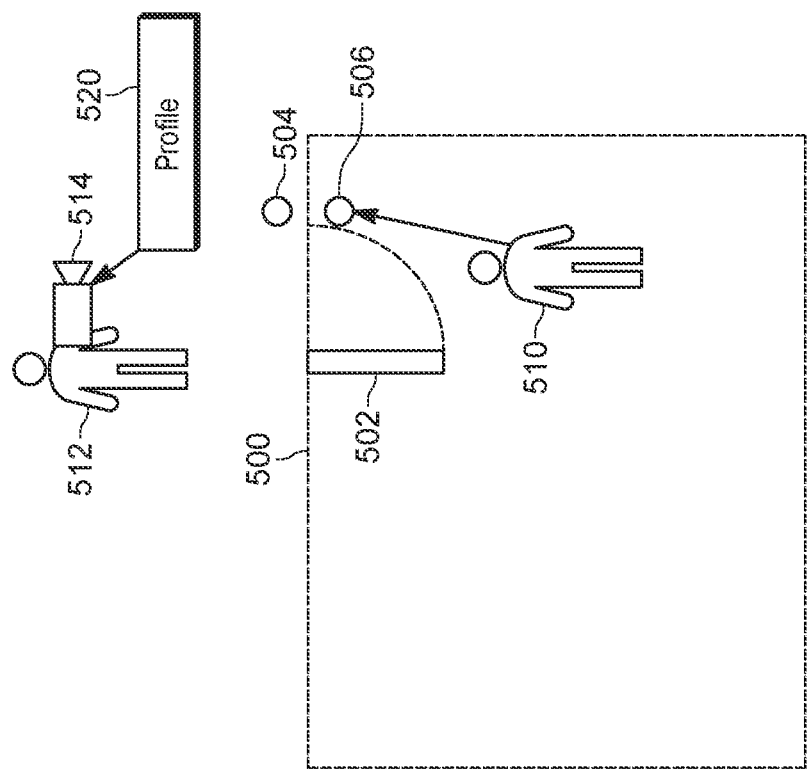
FIG. 5A is a schematic diagram of an example of setting a mobile camera profile based on opening a door from the outside.

FIGS. 5A and 5B show examples of setting a mobile camera profile based on opening a door from the outside or inside of a room. These examples may be implemented using the techniques discussed herein, such as the system 100 of FIG. 1.

A room 500 is guarded by a door 502 that has two sensors, namely, an outside sensor 504 and an inside sensor 506. The outside sensor 504 signals that the door 502 is opened from the outside. The inside sensor 506 signals that the door 502 is opened from the inside. The room 500 may be occupied by a person 510, which may give rise to a privacy or security situation when the door 502 is opened. The room 500 may be a hotel room, for example. In such case, the outside sensor 504 may be a keycard scanner and the inside sensor 506 may be a touch sensor attached to the door handle or a switch connected to an internal mechanical component of the door handle or lock.

In FIG. 5A, the door 502 is opened by a person 510 inside the room 500. The sensor 504 detects that the door 502 is opened and thereby inherently determines that the door 502 is opened from the inside due to the configuration of the sensors 504, 506. Another person 512 may be present outside the room 500 and may have a body-worn camera 514. In the example of a hotel room, the person 512 outside the room 500 may be a cleaner, bellhop, room service, or similar hotel personnel who may wear a camera for safety, security, or dispute resolution purposes. The camera 514 may normally operate according to a profile that enables video and audio recording, while the person 512 carries out their duties. The person 510 inside the room 500 may be a guest who opens the door 502 in response to a knock at the door 502 by the outside person 512. Accordingly, the inside sensor 506 detects the door opening, which indicates that a privacy situation may have arisen, in that the person 510 inside the room 500 may not wish to be recorded by the camera 514. As such, in response to the sensors 504, 506 determining that the manner of the physical access action of opening the door 502 was the door 502 being opened from the inside, the camera 514 may be switched to an operational profile 520 that is preconfigured for the possible privacy situation. The profile 520, for example, may turn off video recording by the camera 514 while keeping audio recording on.

In FIG. 5B, the door 502 is opened from the outside by the outside person 512, as detected by the outside sensor 504. This may result in the inference that the person 510 is absent from the inside of the room 500. Accordingly, a privacy situation may be determined to not exist and the camera 514 may be switched to an operational profile 522 preconfigured for non-private situation, such as recording both video and audio.

FIGS. 6A and 6B show examples of setting a mobile camera profile based on opening a door from the outside or inside of a room. These examples may be implemented using the techniques discussed herein, such as the system 100 of FIG. 1. FIGS. 5A and 5B and related description may be referenced for details not repeated here.

In this example, a person 600 outside a room 500 wears a mobile camera 514. The room 500 may be an operating or consulting room and the person 600 may be a surgeon. Outside the operating or consulting room, the camera 514 may operate according to a profile consistent with the policies of the hospital. When the person 600 opens the door 502 to enter the room 500, the sensors 504, 506 indicate that the physical access action was performed in the manner of someone entering the room 500. In response, the camera 514 may be switched to an operational profile 602 that is preconfigured to disable video and audio recording to ensure that events within the room are not recorded, which in this example protect the privacy of a patient 604 undergoing examination or surgery.

If the person 600 with the camera 514 later opens the door 502 to leave the room 500, the sensors 504, 506 detect this as a physical access action performed in the manner of someone leaving the room 500. In response, the camera 514 switches an operational profile 608 that is preconfigured to enable video and audio recording with the expectation that a person 606 outside the room 500 may raise a security or liability concern. In the operating or consulting room example, a person 606 outside the room may be a family member of the patient 604 inside the room 500.

FIGS. 7A and 7B show examples of setting a fixed-position camera profile based on opening a door from the outside or inside of a room. These examples may be implemented using the techniques discussed herein, such as the system 100 of FIG. 1. FIGS. 6A and 6B and related description may be referenced for details not repeated here.

A fixed-position camera 700 may have its operational profile switch between profiles 602, 608 depending on the manner in which the physical access action of opening a door 502 is performed by a person 600, as detected by sensors 504, 506. In the example of an operating or consulting room, the fixed-position camera 700 may be situated outside the room 500. In other examples, the fixed-position camera 700 may be situated inside the room 500.

Figure 8:
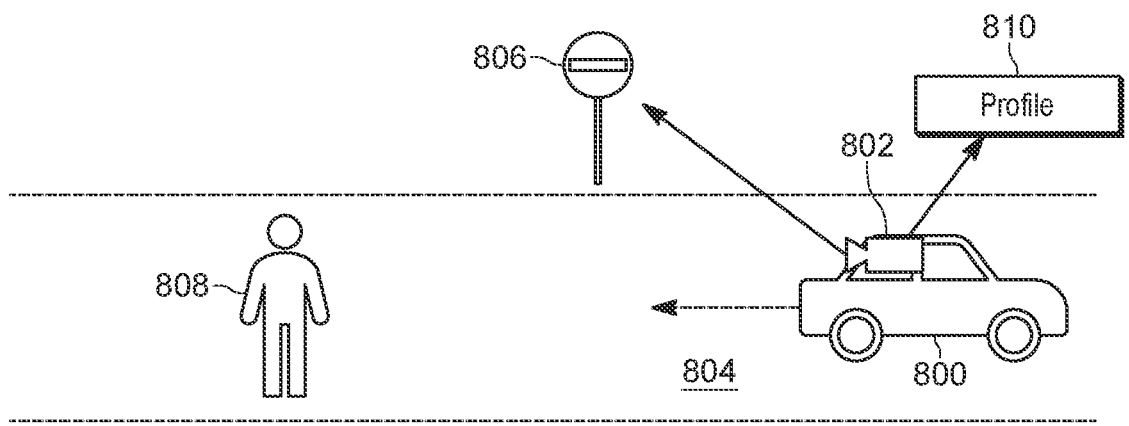
FIG. 8 is a schematic diagram of an example of setting a mobile camera profile based on movement through an open space.

FIG. 8 is a schematic diagram of an example of setting a mobile camera profile based on movement through an open space. This example may be implemented using the techniques discussed herein, such as the system 100 of FIG. 1. FIGS. 5A, 5B, 6A, and 6B and related description may be referenced for details not repeated here.

A vehicle 800 may be provided with a vehicle-mounted camera 802. The camera 802 may normally operate according to a profile that does not record video or audio for sake of privacy of people around the vehicle 800.

The vehicle 800 may undertake physical access actions such as driving down a road. In this example, the vehicle 800 is an emergency response vehicle, such as an ambulance, attending a person 808 in need.

An image recognition function of the camera 802 may be considered a sensor capable of detecting the manner in which the physical access action is performed, which in this example is the vehicle reversing down a narrow alleyway 804. The manner may be determined from the camera 802 detecting the road sign 806, for example, a one-way or do-not-enter sign.

The detection of the road sign 806 by the camera 802 may be considered sensor data and the reversing of the vehicle 800, as detected by the vehicle's computer, may be considered other data (e.g., see 408 at FIG. 4), and such data may be collectively analyzed to determine that the vehicle 800 is attending an emergency situation. Accordingly, the camera 802 may be switched to an operational profile 810 that records video and audio for purposes of safety or liability.

In view of the above, it should be apparent that a camera may have its operational profile set automatically based on the manner in which a physical access action is performed, which provides situation context that may allow the camera to serve its intended purpose (e.g., security, safety, liability, etc.) in a way that is consistent with other concerns, such as privacy. This may be done automatically and without human intervention or judgement, so as to increase the reliability and consistency of how the camera operates.

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot generate and transmit follow-up actions based on specific information security risks, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising." "has", "having." "includes", "including." "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a". "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A non-transitory machine-readable medium comprising instructions that, when executed by a processor, cause the processor to:
   receive an indication of a physical access action performed by a person in proximity of a camera;
   determine a manner in which the physical access action is performed; and
   select an operational profile of the camera to control capture at the proximity of the camera based on the manner in which the physical access action is performed, including switching from a first operational profile to a second operational profile that is different from the first operational profile.

2. The non-transitory machine-readable medium of claim 1, wherein the instructions are configured to determine the manner in which the physical access action is performed directly based on sensor data obtained from a sensor responsive to the physical access action.

3. The non-transitory machine-readable medium of claim 1, wherein the instructions are configured to determine the manner in which the physical access action is performed by computing an inference based on data related to the physical access action including sensor data obtained from a sensor responsive to the physical access action.

4. The non-transitory machine-readable medium of claim 1, wherein:
   the physical access action comprises operating a door; and
   the instructions are configured to determine the manner in which the physical access action is performed by determining a side of the door from which the door is operated.

5. The non-transitory machine-readable medium of claim 1, wherein the instructions are configured to process sensor data obtained by a sensor at the door to determine the side of the door from which the door is operated.

6. The non-transitory machine-readable medium of claim 1, wherein the first and second operational profiles differ in a set of information recorded.

7. The non-transitory machine-readable medium of claim 1, wherein the operational profile controls a function of the camera selected from the following functions:
   video capture;
   audio capture;
   pan;
   zoom;
   tilt;
   filter;
   light capture spectrum;
   video compression;
   video storage;
   audio compression;
   audio storage; and
   video analytics.

8. A system comprising:
   a sensor configured to capture sensor data that describes a physical access action;
   a camera operable according to an operational profile to capture a scene that includes a physical access location subject to the physical access action; and
   a processor connected to the sensor and the camera, the processor configured to:
      determine a manner in which the physical access action is performed based on the sensor data captured by the sensor; and
      set the operational profile of the camera based on the manner in which the physical access action is performed by selecting the operational profile from a first operational profile and a second operational profile that is different from the first operational profile.

9. The system of claim 8, further comprising an additional data source related to the physical access action and connected to the processor, wherein the processor is configured to infer the manner in which the physical access action is performed based on:
   the sensor data captured by the sensor; and
   additional data obtained from the additional data source.

10. The system of claim 8, wherein:
    the sensor is positioned with respect to a door at the physical access location;
    the physical access action includes operating the door; and
    the processor is configured to determine a manner in which the door is operated by determining from the sensor data a side of the door from which the door is operated.

11. The system of claim 8, wherein the first operational profile captures or records video and the second operational profile does not capture or record video.

12. The system of claim 8, wherein the first and second operational profiles cause the camera to capture different sets of information from the scene.

13. The system of claim 8, wherein the camera is a body-worn camera wearable by a person expected to perform the physical access action.

14. The system of claim 8, wherein the camera is a fixed-position camera.

15. The system of claim 8, wherein the sensor is a component of the camera.

16. A method comprising:
    receiving an indication of a physical access action performed by a person in proximity of a camera;
    determining a manner in which the physical access action is performed; and
    setting an operational profile of the camera to control capture at the proximity of the camera based on the manner in which the physical access action is performed by selecting the operational profile from a first operational profile and a second operational profile that is different from the first operational profile.

17. The method of claim 16, wherein:
    receiving the indication of the physical access action includes receiving sensor data from a sensor at the proximity of the camera; and
    determining the manner in which the physical access action is performed includes analyzing the sensor data.

18. The method of claim 17, wherein determining the manner in which the physical access action is performed includes analyzing the sensor data in conjunction with other data related to the physical access action.

19. The method of claim 18, wherein the other data comprises scheduling data related to a physical access location at which the physical access action is expected to occur.

20. The method of claim 16, wherein:
    the physical access action comprises operating a door; and
    determining the manner in which the physical access action includes determining a side of the door from which the door is operated.

\* \* \* \* \*